United States Patent Office 3,462,366
Patented Aug. 19, 1969

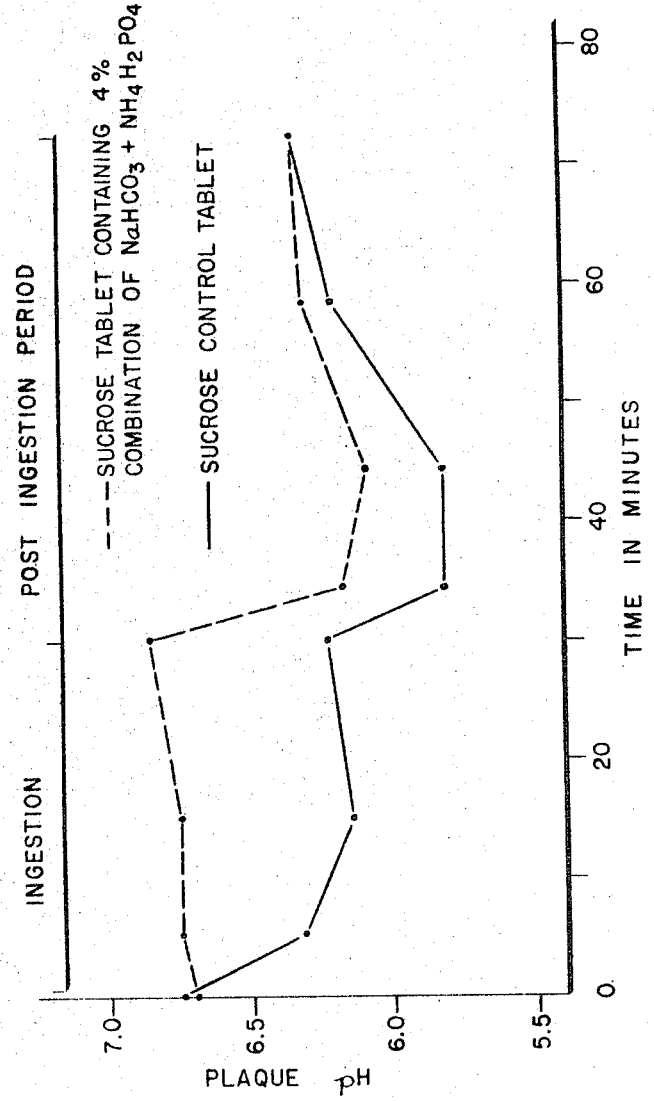

3,462,366
CARIOSTATIC BUFFER COMPOSITION
Heikki Luoma, Fabianinkatu 24, Helsinki 10, Finland
Filed July 20, 1966, Ser. No. 566,569
Int. Cl. C09k 3/00
U.S. Cl. 252—1         4 Claims

ABSTRACT OF THE DISCLOSURE

A composition comprising sucrose or a carbohydrate, about 2–5% by weight of a buffer mixture comprising about 7–11 mol percent of sodium bicarbonate and about 0.5–2.0 mol percent of monosodium, monopotassium or monoammonium orthophosphate.

---

This invention relates to an improved method for maintaining the pH of the system surrounding the teeth within a suitably high pH range while and subsequent to association with edible carbohydrates and to a novel composition of matter comprising sugar, i.e., sucrose, or other edible saccharides or carbohydrates mixed with a combination of buffering agents.

More specifically, it has been found that the addition of a certain buffer combination to sucrose and sucrose-containing foodstuffs can prevent the lowering of the pH in dental plaque which normally occurs during the bacterial fermentation of carbohydrate foodstuffs in the oral cavity. Moreover, these buffer combinations have been found to compensate for the release of inorganic phosphate from tooth enamel which also is known to occur as a result of diets which include various forms of refined carbohydrates.

It has been shown that in a test solution containing as much dicalcium phosphate as saliva, tooth enamel is dissolved markedly at a pH below 5.5–5.0 (Stephan, R. M., J. Am. Dent. Assoc., 27: 718–23 (1940). While the pH of saliva itself during and after carbohydrate ingestion very rarely decreases below 6.0, a marked drop in pH does occur in the dental plaque present, i.e., the soft microbial coatings on tooth surfaces. Carbohydrates which are being digested in the mouth diffuse into plaque from saliva and with some food particles become lodged in the plaque. Acids are produced in the dental plaque during the bacterial fermentation and digestion of these food particles. The neutralization of these acids by natural salivary buffers is not ordinarily sufficient to prevent lowering of plaque pH. Thus, a favorable climate for the dissolution of tooth enamel is established.

Stralfors, A., in an unpublished study referred to by Bibby, B. G., et al. (J. Dent. Res. 42: Suppl. 1, 477–87, 1963), suggested that phosphates act as cariostatic agents by becoming incorporated in the dental plaque and buffering the acids as they are formed. Bibby, B. G., et al. emphasized the need for the presence of phosphates in the ingested material in order to obtain the greatest protective effect. The need for dietary buffers containing phosphates became more apparent after Luoma, (Acta Odont. Scand., 22: Suppl. 41, 1964), found that marked pH and phosphate drops can occur in human plaque not only after sugar ingestion as previous observations had indicated, but also during sugar ingestion itself.

Much work has already been done on the use of phosphates and a variety of other buffering agents in caries prevention.

Stralfors, A., in a series of studies has reported on the effects on caries of sodium phosphate, mono-, di- and tribasic calcium phosphates, calcium carbonate and sodium bicarbonate in the diet and/or in drinking water. König, K. G. and Mühlemann, H. R. (Helv. Odont. Acta, 8: Suppl. I, 41–56, 1964) found that dietary additions of sodium bicarbonate and disodium phosphate lessened caries in rats. Ammonium phosphate is also known to inhibit the cariogenic effect of fermentation acids. Australian specification No. 6,756/61 discloses the use as cariostatic agents of phosphate esters derived from hydroxyl-containing organic substance, especially calcium sucrose phosphate, by addition to foodstuffs, beverages, oral hygiene preparations or lozenges. A combination containing a soluble fluoride with various calcium phosphates is disclosed in U.S. Patent No. 2,876,166 as being useful for the inhibition of dental enamel solubility.

Luoma et al., in Suom. Hammaslääk. Toim. 60: 303–15 (No. 4, 1964) have reported on the increase in the inorganic phosphorus content of dental plaque and the elevation of plaque pH due to the addition to sugar tablets of a particular buffer combination of sodium carbonate and monosodium phosphate where the components are present in a molar ratio of 1.0 M $Na_2CO_3$ to 1.2 M

$NaH_2PO_4 \cdot 2H_2O$

While the results with the abovementioned combination were encouraging, the salty taste imparted to the sugar by the buffer additive was a disadvantage which limited its utility in certain foods and beverages.

It has now been found, in accordance with this invention, that in combination with edible carbohydrates the mixture of sodium bicarbonate with an acid phosphate, such as sodiumorthoph osphate, potassium orthophosphate and especially ammonium orthophosphate, provides an improved buffer system for the inhibition of acid attack on dental enamel. More specifically, results obtained with a combination of sodium bicarbonate and monoammonium phosphate tested in sucrose have been particularly outstanding. The provision of an increased concentration of buffers in saliva apparently forces the buffers to diffuse into the dental plaque in concentrations high enough to neutralize the acids formed by the oral bacterial during sugar fermentation.

The use of the acid phosphate component has a number of advantages in that the alkaline taste of the sodium bicarbonate is lessened by the presence of acid phosphate and that the requirement of the dental plaque for additional inorganic phosphate, thought to be transformed into organic phosphates by plaque bacteria during acid fermentation, can be satisfied. Thus, the possible utilization or storage of tooth phosphate by the fermentation bacteria is minimized.

In accordance with this invention, extensive tests have determined the most effective buffer combination and the concentrations at which the components of these combinations yield optimum results.

The superiority of the sodium bicarbonate/phosphate buffer combinations of this invention over other buffer systems and controls is demonstrated by the results obtained on carrying out the following in vitro studies:

TEST I

In accordance with this test procedure salivary glands of the subject involved are stimulated by sucking a simulated tablet of rubber. The saliva is collected and this saliva is used as a control (C). Sugar tablets are then sucked for stimulation to obtain other saliva samples, one of which is used as a sugar-control (Cs). 50 mg. of each of the buffer combinations indicated are added to 5 ml. aliquots of the Cs saliva. The solutions C, Cs and 1.Cs initially had a pH of 7.1. All other test solutions had a pH of 7.4 at the start of the test. Each test solution was titrated and the number of milliliters of 0.05 N HCl required to bring each solution down to a pH range of 4.0 is given in Table I below:

TABLE I.—TITRATION WITH 0.05 N HYDROCHLORIC ACID

| | Milliliters of 0.05 N HCl |
|---|---|
| C: stimulated saliva control | 2.0 |
| $C^s$: sugar stimulated saliva control | 2.15 |
| 1.$C^s$: 1.00 M $CaHPO_4$+2.34 M NaCl | 2.4 |
| 2.$C^s$: 5.20 M $K_2HPO_4$+1.00 M $KH_2PO_4$ | 6.9 |
| 3.$C^s$: 4.57 M $Na_2HPO_4$+1.00 M $NaH_2PO_4 \cdot H_2O$ | 7.5 |
| 4.$C^s$: 5.28 M $(NH_4)_2HPO_4$+1.00 M $NH_4H_2PO_4$ | 8.4 |
| 5.$C^s$: 1.00 M $Na_2CO_3$+1.23 M $NaH_2PO_4 \cdot H_2O$ | 8.8 |
| 6.$C^s$: 8.03 M $NaHCO_3$+1 M $NaH_2PO_4 \cdot H_2O$ | 11.3 |
| 7.$C^s$: 9.82 M $NaHCO_3$+1 M $KH_2PO_4$ | 11.8 |
| 8.$C^s$: 9.17 M $NaHCO_3$+1 M $NH_4H_2PO_4$ | 12.0 |

The sodium bicarbonate/orthophosphate buffer combinations (6.$C^s$, 7.$C^s$ and 8.$C^s$) are quite superior in this system since they require from 2.5 to 3.2 ml. more of the 0.05 N HCl than the 5.$C^s$ system of sodium carbonate/monosodium phosphate combination previously reported by Luoma et al. in Suom. Hammaslääk. Toim. 60: 303–15 (No. 4, 1964).

TEST III

In vitro studies were conducted to determine the effect of these systems on reduction in plaque pH, as well as the release of radioactive phosphorus ($P^{32}$) from enamel. Buffer combinations 5.$C^s$, 6.$C^s$, 7.$C^s$ and 8.$C^s$ in Table I above are incorporated into powdered sugar at levels of 2% by weight, based on the weight of the sugar and compressed into tablets using magnesium stearate as the lubricant. Each tablet when dissolved in 100 ml. of water has a pH of from about 7.25 to about 7.50. Identical sugar tablets but without the buffer additive were used as controls. The test protocols used were similar and secreted saliva samples were obtained similarly by sucking on a simulated tablet of rubber to obtain the nonsugar control (C); by sucking on plain sugar tablets to obtain the sugar control ($C^s$); the test saliva samples were obtained by sucking on the four different buffer-containing sugar tablets (hereinafter referred to as "modified" sugar) to obtain the desired saliva test solutions identified respectively as 5.$C^s$, 6.$C^s$, 7.$C^s$ and 8.$C^s$ in Table II below. Equal volumes of the various saliva samples were then incubated for four hours with standard amounts of neutronirradiated enamel granules, the granules being covered with a standard amount of centrifuged dental plaque.

TABLE II.—2% MODIFIED SUGAR TABLETS

| | pH Range | $P^{32}$ in Plaques, $10^3$ counts/min. | $P^{32}$ saliva solns., $10^3$ counts/min. |
|---|---|---|---|
| C stimulated saliva control | 4.0–7.5 | 7.5 | 17.5 |
| $C^s$ sugar stimulated saliva control | 5.0–7.5 | 6.5 | 38.5 |
| 5.$C^s$ 1.00 M $Na_2CO_3$ 1.23 M $NaH_2PO_4 \cdot H_2O$ | 6.2–6.6 | 8.0 | 21.0 |
| 6.$C^s$ 8.03 M $NaHCO_3$+1.00 M $NaH_2PO_4 \cdot H_2O$ | 6.0–6.8 | 7.0 | 20.5 |
| 7.$C^s$ 9.82 M $NaHCO_3$+1.00M $KH_2PO_4$ | 6.2–6.8 | 7.5 | 17.0 |
| 8.$C^s$ 9.17 M $NaHCO_3$+1.00 M $NH_4H_2PO_4$ | 6.4–6.9 | 7.0 | 15.5 |

Results of these studies indicate that in the presence of saliva produced by sucking the control sugar tablets, the pH of the underlying plaque was decreased to almost 5.0 and the release of radioactive phosphate ($P^{32}$) from the enamel was increased by 80% over the amount released in the nonsugar control system. In the test systems where the saliva was obtained by sucking the modified sugar tablets the drop in the plaque pH was lessened appreciably and the effect of the presence of sugar on the release of $P^{32}$ from the enamel was compensated quite satisfactorily. The $NaHCO_3$+$NH_4H_2PO_4$ buffer system was clearly the most effective of the four combinations tested. The buffer system $Na_2CO_3$+$NaH_2PO_4 \cdot H_2O$ in a sugar tablet was the weakest combination of the group.

The test system employed is described also in the Proceedings of the International Association of Dental Research, March 24–27, 1966 (Miami meeting) Abstract 205.

TEST III

3%, 4%, 5% sodium bicarbonate/monoammonium phosphate modified sugar

In vivo plaque tests were conducted using a total of 36 test subjects in three different experiments. It was intended to compare the effect of control sugar tablets with that of modified sugar tablets containing 3%, 4% and 5% of the 9.7 M $NaHCO_3$+1 M $NH_4H_2PO_4$ buffer combination.

In order to accumulate dental plaque, subjects were asked not to brush their teeth for three days. Only subjects having a profuse plaque growth were selected for this test series. Customary dietary habits could be followed but the subjects were asked not to eat apples or similar foods which would retard plaque formation. On the day of the experiment an interval of at least 3 hours was kept between the last meal and the start of the experiment. For the first pH measurement a small amount of plaque was taken from 4 different locations of the dentition, and the material was homogenized in ice water before measurement. The subjects were then asked to consume the 5 percent modified sugar tablets or control tablets. Each tablet was initially broken to 5–6 pieces and then sucked. Before the first tablet was completely dissolved, a second tablet of the same kind was taken. This procedure was continued for 30 minutes. The number of tablets consumed varied from 7 to 17. Plaque samples were taken as for the first pH measurement at intervals of 5, 15, 30, 35, 45, 60 and 75 minutes. pH determinations were made on all samples collected during the ingestion and post ingestion periods. After one week the same subject came for the second session, again with a three day accumulation of plaque on the dentition. The procedure of the first session was repeated using either the experimental or the control tablets as the case might be.

Tests with the 3 percent and 4 percent modified sugar tablets were conducted using the same procedure as above with the exception that a standard number of ten tablets were consumed within a 30 minute period for both the test and the control tablets.

The 3% buffer combination in the sucrose tablet was found to raise plaque pH about 0.4 unit from the sugar control level during the ingestion period only. It had no significant effect during the post ingestion period.

The effect of the 4% combination was distinctly better than that of the 3% combination while the 5% combination was somewhat weaker than the 4% combination. In the accompanying drawing the effect of the 4% combination in sucrose tablets on plaque pH during ingestion and post ingestion periods is shown and is also compared to the effect of sucrose control tablets. During the ingestion period, the modified sucrose tablets containing 4% of the buffer combination were able to prevent entirely the drop in plaque pH which occurred when the control sucrose tablets were sucked. Moreover, during the post ingestion period when plaque pH reaches its lowest values, the pH remained higher after utilizing tablets containing 4% of the buffer combination than after the control tablets.

The taste imparted by the sodium bicarbonate/orthophosphate buffer combinations of this invention to the experimental tablets was not found unpleasant by the subjects who ingested them, even at the 5% concentration. This is in contrast to the results obtained with the previously reported sodium carbonate/monosodium phosphate buffer combination reported by Luoma et al., in Suom. Hammaslääk. Toim., 60: 303–15 (No. 4, 1964). Furthermore, as seen in Table I and Table II, improved buffering capacity is obtained with the products of this invention. The results of Test III, as shown in the accompanying drawing, clearly demonstrate the effectiveness of the preferred product of this invention in maintaining the high pH range in dental plaque surrounding the teeth.

The preferred $NaHCO_3 + NH_4H_2PO_4$ buffer combination of this invention may be added to sugar itself, to candy products or to any sugar-containing foodstuffs to aid in the prevention of caries. Such foodstuffs may include beverages, confectionary products, cereals, bakery products, syrups, canned foods, ice cream, condiments, gelatins and the like. The buffer combination may also be incorporated in oral hygiene preparations, medicinal tablets or lozenges having a sugar base to provide a cariostatic effect and to counteract the cariogenic properties of any carbohydrates present in said preparations.

The cariostatic buffer combination of this invention is effective during the digestive fermentation of any carbohydrate foodstuff by the oral bacteria. Therefore, it may be added to a variety of cereals, bakery products, vegetables and other starch containing food products.

The cariostatic buffer combination of this invention may be added to any sucrose-containing preparation at levels of about 2% to about 5% by weight, based on the weight of sucrose. The relative molar concentrations of the buffer components in the combination employed should be in the ratio of from about 7 to about 11 mols of $NaHCO_3$ to from about 0.5 to about 2 moles of $NH_4H_2PO_4$. A preferred buffer-sucrose combination contains about 4% by weight of about 9.2 mols of $NaHCO_3$ to about 1 mol of $NH_4H_2PO_4$, based on the weight of sucrose. The pH of a solution of 2 grams of such a modified sugar preparation in 100 ml. of water or saliva will fall within the range of 7.25 to 7.50, and preferably about 7.4.

By way of illustration, an experimental modified sugar tablet of this invention may be prepared as follows:

Example 1.—2 gram test tablets described were prepared containing, by weight, 2% water, 92.82% sucrose, 1.25% magnesium stearate and 3.93% of a buffer mix consisting of 9.17 mol percent $NaHCO_3 + 1$ mol percent $NH_4H_2PO_4$. The buffer components were ground in a disc mill to about 100 mesh, added to the remainder of the ingredients in the dry state and the mixture then compressed into uncoated finished tablets having the following specifications: diameter, 12/16"; thickness, 0.210"; hardness, 40 lb./sq. inch; weight 2.0 gm. per tablet. A solution formed by dissolving this tablet in 100 ml. of water yields a solution whose pH is approximately 7.4.

The following example is an illustration of a sucrose product of this invention which is suitable for inclusion in foodstuffs or other edible preparations wherever sucrose is normally employed as a component to provide the desired taste.

Example 2.—A buffer combination is prepared by admixing 77.0 grams of reagent grade $NaHCO_3$ with 11.5 grams of reagent grade $NH_4H_2PO_4$. This mixture is ground in a disc mill to about 100 mesh. 4 grams of this buffer combination are then added to 96 grams of granulated sugar in the dry state and mixed for approximately 20 minutes. 2 grams of this product, when dissolved in 100 ml. of water, have a pH of about 7.4.

When dissolved in water, there is practically no taste of salts detectable. Even in the dry state, the very weak taste of the salts at this 4% concentration is not disturbing.

It is understood that the foregoing detailed description is given merely by way of illustration and that many variations may be made therein without departing from the spirit of my invention.

Having described my invention, what I desire to secure by Letters Patents is:

1. A composition of matter comprising (a) carbohydrate, and (b) from about 2% to about 5% by weight, based on the weight of carbohydrate, of a buffer mixture comprising from about 7 to about 11 mol percent of sodium bicarbonate and from about 0.5 to about 2.0 mol percent of an orthophosphate selected from the group consisting of monosodium, monopotassium and monoammonium orthophosphate.

2. A composition of matter comprising (a) sucrose, and (b) from about 2% to about 5% by weight, based on the weight of sucrose, of a buffer mixture comprising from about 7 to about 11 mol percent of sodium bicarbonate and from about 0.5 to about 2.0 mol percent of an orthophosphate selected from the group consisting of monosodium, monopotassium and monoammonium orthophosphate.

3. A composition according to claim 2 wherein from about 3% to about 5% of said buffer mixture is present.

4. A composition according to claim 2 wherein the buffer mixture present includes the components in a ratio of from about 9.2 mol percent of sodium bicarbonate to about 1 mol percent of monoammonium orthophosphate.

References Cited

UNITED STATES PATENTS 2,128,917  9/1938  Crocker _____ 167—93

RICHARD L. HUFF, Primary Examiner

U.S. Cl. X.R.

424—57

UNITED STATES PATENT OFFICE
CERTIFICATE OF CORRECTION

Patent No. 3,462,366                                August 19, 1969

Heikki Luoma

It is certified that error appears in the above identified patent and that said Letters Patent are hereby corrected as shown below:

Column 2, line 8, "substance" should read -- substances -- line 29, "sodiumorthoph osphate" should read -- sodium orthophosphate --; line 39, "bacterial" should read -- bacteria --. Column 3, line 26, "TEST III" should read -- TEST II --; Table II, line 3, "4.0-7.5" should read -- 7.0-7.6 --; same Table II, line 5, 5.$C^S$ 1.00 M $Na_2CO_3$ 1.23 M $NaH_2PO_4 \cdot H_2O$ should read 5.$C^S$ 1.00 M $Na_2CO_3$ + 1.23 M $NaH_2PO_4 \cdot H_2O$ Column 4, line 12, "9.7" should read -- 9.17 --.

Signed and sealed this 23rd day of June 1970.

(SEAL)
Attest:

EDWARD M. FLETCHER, JR.                        WILLIAM E. SCHUYLER, JR.
Attesting Officer                                   Commissioner of Patents